(12) United States Patent
Shawn et al.

(10) Patent No.: US 9,621,539 B2
(45) Date of Patent: Apr. 11, 2017

(54) METHOD AND APPARATUS FOR SECURING THE PRIVACY OF A COMPUTER NETWORK

(76) Inventors: William H. Shawn, Washington, DC (US); Frederick J. Murphy, Falmouth, MA (US)

( * ) Notice: Subject to any disclaimer, the term of this patent is extended or adjusted under 35 U.S.C. 154(b) by 0 days.

(21) Appl. No.: 10/767,815

(22) Filed: Jan. 30, 2004

(65) Prior Publication Data

US 2011/0022836 A1 Jan. 27, 2011

(51) Int. Cl.
*H04L 29/06* (2006.01)
*H04L 9/32* (2006.01)
*G06F 21/62* (2013.01)

(52) U.S. Cl.
CPC ........ *H04L 63/0823* (2013.01); *H04L 9/3252* (2013.01); *H04L 9/3263* (2013.01); *H04L 9/3271* (2013.01); *H04L 63/10* (2013.01); *G06F 21/62* (2013.01); *G06F 21/6245* (2013.01)

(58) Field of Classification Search
None
See application file for complete search history.

(56) References Cited

U.S. PATENT DOCUMENTS

| | | | | |
|---|---|---|---|---|
| 6,480,850 | B1 * | 11/2002 | Veldhuisen | G06F 21/6245 707/600 |
| 7,167,842 | B1 * | 1/2007 | Josephson et al. | 705/64 |
| 7,218,735 | B2 * | 5/2007 | Coron et al. | 380/30 |
| 7,493,497 | B1 * | 2/2009 | Tan, Jr. | 713/189 |
| 7,496,191 | B1 * | 2/2009 | Crews et al. | 379/220.01 |
| 7,596,812 | B2 | 9/2009 | Li et al. | |
| 2002/0016923 | A1 * | 2/2002 | Knaus et al. | 713/200 |
| 2002/0150241 | A1 * | 10/2002 | Scheidt et al. | 380/44 |
| 2002/0159601 | A1 * | 10/2002 | Bushmitch | H04L 29/06 380/277 |
| 2002/0188589 | A1 * | 12/2002 | Salmenkaita | G01C 21/20 |
| 2003/0004734 | A1 * | 1/2003 | Adler et al. | 705/1 |
| 2003/0014371 | A1 * | 1/2003 | Turgeon | G06Q 20/027 705/71 |
| 2003/0035548 | A1 * | 2/2003 | Kwan | 380/286 |
| 2003/0065727 | A1 * | 4/2003 | Clarke et al. | 709/206 |
| 2003/0088520 | A1 * | 5/2003 | Bohrer et al. | 705/74 |
| 2003/0115468 | A1 * | 6/2003 | Aull et al. | 713/175 |
| 2003/0131011 | A1 * | 7/2003 | Haunschild et al. | 707/100 |
| 2003/0163351 | A1 * | 8/2003 | Brown et al. | 705/2 |
| 2004/0078599 | A1 * | 4/2004 | Nahum | 713/201 |
| 2004/0098285 | A1 * | 5/2004 | Breslin et al. | 705/1 |
| 2005/0102194 | A1 * | 5/2005 | Kuehr-McLaren | G06Q 30/0277 705/14.73 |
| 2005/0131839 | A1 * | 6/2005 | Cordery et al. | 705/78 |
| 2005/0132188 | A1 * | 6/2005 | Khin et al. | 713/166 |

* cited by examiner

*Primary Examiner* — Hadi Armouche
*Assistant Examiner* — Malcolm Cribbs

(57) ABSTRACT

A method and apparatus for secure access to a computer network and for safeguarding the confidentiality and privacy of data stored and distributed by the network is disclosed. The method and apparatus addresses both limiting access to the computer network to those who are authorized to have access as well as the privacy of the information stored in the network.

17 Claims, 4 Drawing Sheets

METHOD AND APPARATUS FOR SECURING THE PRIVACY OF A COMPUTER NETWORK

BACKGROUND OF THE INVENTION

The present invention is generally related to the field of computer networks and more particularly, is directed to a method and apparatus for secure access to a computer network and for safeguarding the confidentiality and privacy of data stored and distributed by the network.

The wide spread use of computers and the emergence of the Internet has lead to a revolution in data collection, storage and distribution. (Herein, the terms "data" and "information" are used interchangeably). Today, most organizations could not conduct their affairs without the aid of computerized information systems which help to collect, process, and distribute information. Such systems are taken for granted as a necessity for conducting business on even a modest scale.

Prior to the advent of personal computers and computer networks, most information was collected manually and stored in hard copy form in physical file drawers. Because there were usually no more than one or two copies of each document, their location and safeguarding were easy to control. Even when mainframe computers became available, the information had to be collected manually and in many cases manually entered into the computer as well. The labor intensive nature of the process necessarily limited the amount of information that was collected and entered into the computer.

Access to the stored information also was limited. The information could only be retrieved by outputting to an associated terminal unit, printer and/or magnetic tape drive. Security of the information usually was not an issue as the entire computer infrastructure was under the control of the business owner. Security resulted from a limited number of trusted employees having the skill set needed to gain access to information stored on the mainframe computer and by in-house mainframes typically not being networked with outside computers. Thus, a company's physical infrastructure, the limited number of employees with the requisite skill set and the lack of networking with other computers provided the ultimate firewall. Accordingly, the likelihood that the computer could be "hacked" from the outside was greatly reduced and the company and its customers felt secure from unauthorized access to company records.

Today, the situation is much different. The relationship that most customers have, for example, with their bank allows the customer online access to his or her banking records. In most cases the customer can transfer funds from one account to another, including the accounts of a third party. Both the customer and the bank benefit from this relationship. The customer can bank at a time that is convenient for him or her and the bank has the opportunity to collect a service fee with almost no human intervention. The third beneficiaries to this relationship are those who wish to engage in mischief, fraud and theft by gaining unauthorized access to the records of bank customers and initiating transactions for their own benefit.

Because computer technology has been developed to the point that it can be readily understood, the skill set required to engage in mischievous conduct is low and can be easily acquired. It is the unintended beneficiaries of online relationships who engage in such conduct that require that attention be paid to computers and network security.

While the advantages of conducting business transactions that involve confidential and private information online are many, these advantages give rise to many security challenges. The challenges are two-fold. The first challenge is to deny entry to those who are not authorized to gain access to the system. The second challenge is in maintaining the privacy of user information once it has been collected and stored in the system. While neither of these challenges are new, they have been greatly aggravated and made more difficult by the number of people and commercial establishments who now use online systems and the amount of data that these systems collect and store. The opportunity to engage in mischief by unscrupulous computer users has risen at a corresponding rate.

Unlike in the past when collecting and entering information into a computer system was very labor intensive and thus the volume of information was low, today there are many fast and efficient ways in which the information can be collected and entered. Modern computer systems are replete with user friendly forms that information providers can fill out themselves and not have to rely on company computer operators to complete. Thus, the bottle neck of information collection and entry that existed in the past has been eliminated in large measure. This has lead to more information being collected and stored from many more people.

In addition, modern computers and computer networks can be programmed to automatically collect information about users, sometimes without their knowledge. For example, the log files in a web server maintains a record of what websites were visited by a web surfer, the time and date, the Internet Protocol address of the computer being used, and in some cases, user identities and passwords. Many people consider this information confidential and private.

The concern with protecting the confidentiality and privacy of online information in today's world is evident from the actions being taken or planned by most governments of developed countries. For example, in the United States, there are national laws that regulate the use and collection of personal data by financial institutions and government agencies. In addition, the United States enacted legislation entitled the Health Insurance Portability and Accountability Act of 1996 which took effect on Aug. 21, 1996. The act is intended to improve the efficiency and effectiveness of the U.S. health care system by facilitating the electronic exchange of information in the health care industry. The Act recognized the challenges to confidentiality of health related information and included specific provisions for its confidentiality and privacy.

In Europe, the European Union Privacy Directive went into effect on Oct. 25, 1998. This Directive, also known as the EU Data Protection Directive, requires that each EU member state enact legislation to protect personal data. According to the Directive, personal data policies must require, among other things, that:

Data be processed fairly;

Data be collected and possessed for specified, legitimate purposes and be kept no longer than necessary to fulfill the stated purpose for which the data was collected;

Data be accurate and up to date; and

Authorizes users of personal data must not transfer that data to third parties without the permission of the individual providing the data. Personal data can only be transferred across national borders when the receiving country has an adequate level of protection for the data.

The Directive also requires that the person about whom the data concerns be given adequate notice of activity regarding the data. The notice must include the identity of the party collecting or using the data; the purpose for which the data may be used; and such other information as is necessary to ensuring that the processing of the date is "fair" to the individual.

The implications and practical difficulty of implementing the EU Directive are great and go beyond the boundaries of the 15 European Union countries. As the Directive requires that no person data can be transferred across borders unless the receiving country has an adequate level of protection for the data, the effect of the Directive has international dimensions. Moreover, compliance with the notice requirement mentioned above will be difficult to achieve using conventional methods given an increasingly global market place, which by its nature, knows no international boundaries.

While attempts have been made to address the security needs of computers and computer networks with respect to preventing unauthorized access and misuse, of confidential information, these attempts increasingly fall short of what is needed to fully address the problem. Unlike in the past, most mainframe computer systems are now networked to other computers that are outside of the control of the mainframe owner. The natural fire wall that existed in the past is no longer present today. Also, the skill level required to operate and access information stored in these computers, while still high compared to prior standards, is easily within reach of most who wish to acquire the skill. Moreover, the number of people who are computer savvy beyond just a casual knowledge of how to use a computer continues to grow. In additional, criminal enterprises naturally move to targets of opportunity whenever they arise. Online confidential and proprietary information represent such targets.

E-mail, for example, has become one of the most prevalent means for communicating information within and across organizations. Thus, the need for securing and validating that only authorized users can access their own e-mail accounts becomes mission critical in many situations. The security of e-mail messages are particularly problematic due to the propensity that many e-mail users have to send copies to multiple recipients. Thus, not only must the originator of the e-mail be validated for access, the universe of recipients must be as well.

Thus, approaches to computer and network security that were sufficient in the past are no longer equal to the challenge that today's security risks present. Accordingly, there is a need in the art for a more effective solution.

SUMMARY OF THE INVENTION

Accordingly, it is the overall objective of the present invention to provide a method and apparatus for overcoming the above noted deficiencies in the security of computers and computer networks.

It is a specific objective of the present invention to provide a method and apparatus for overcoming the above noted deficiencies in the security of computers and computer networks that is more effective than those presently known in the art.

It is another objective of the present invention to provide a method and apparatus for overcoming the above noted deficiencies in the security of computers and computer networks which can be implemented in a cost effective manner.

It is still further objective of the present invention to provide a method and apparatus for overcoming the above noted deficiencies in the security of computers and computer networks which can be used with prior art networks.

It is another objective of the present invention to provide a method and apparatus for overcoming the above noted deficiencies in the security of computers and computer networks which can be easily implemented.

BRIEF DESCRIPTION OF THE DRAWINGS

The present invention may be more completely understood in consideration of the following detailed description of various embodiments of the invention in connection with the accompanying drawings, in which.

DESCRIPTION OF THE PREFERRED EMBODIMENT

Figure 1:
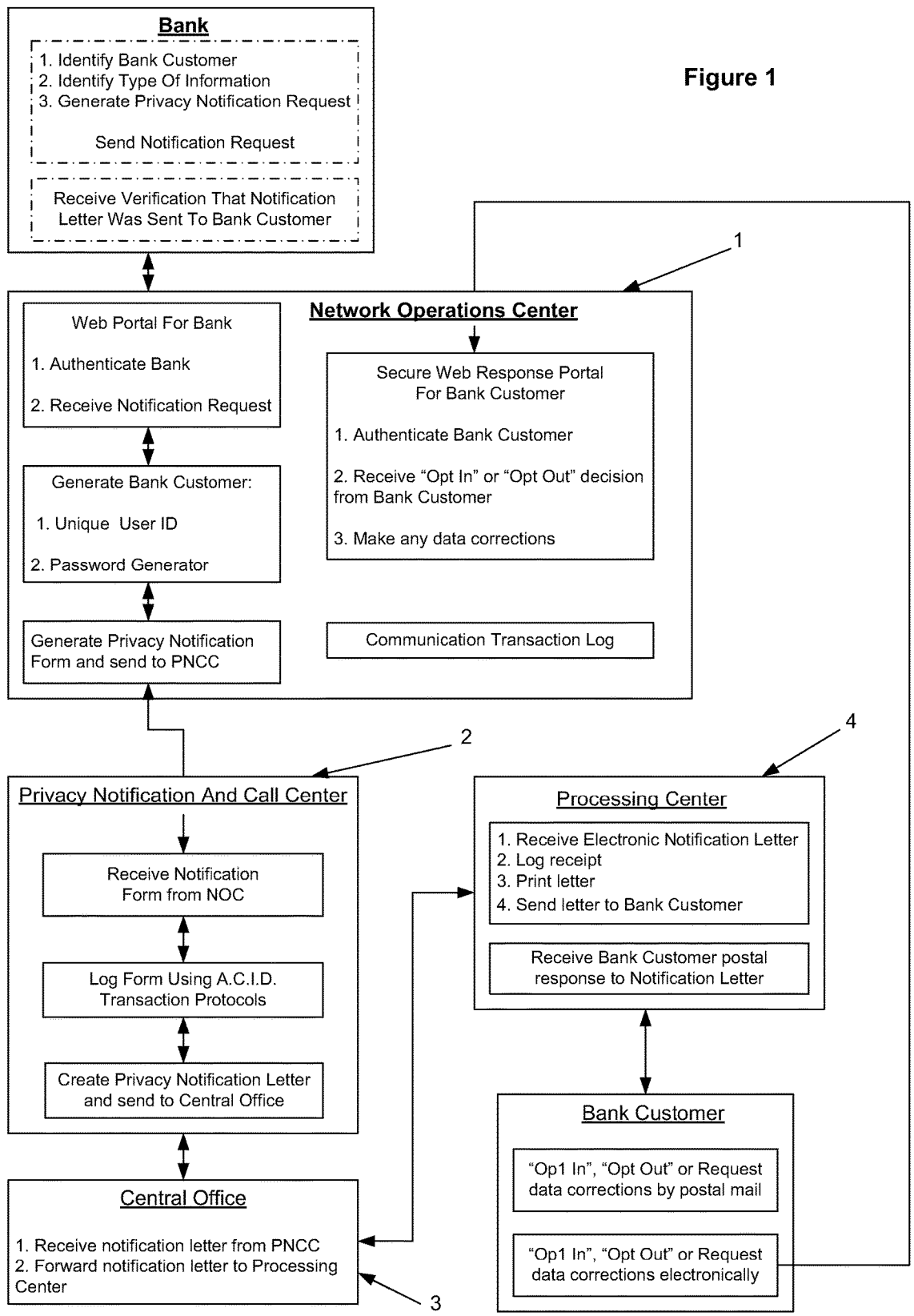
FIG. 1 is a diagram illustrating the general architecture of the present invention.

FIG. 1 is a diagram of one embodiment of a network infrastructure which can be used to achieve the notification requirements of the EU Directive in accordance with the present invention. NOC 1 (Network Operations Center) is an ultra secure FIPS complaints data communications gateway located, for example, in Northern Virginia. NOC 1 provides point-to-point secure socket layer encryption, intrusion detection, non-repudiation protocols and securely maintains complete electronic communications transaction logs. NOC 1 also generates a challenge/answer password and unique user identification for inclusion in the notification letter that is physically sent to the EU data subject, i.e., the person whose personal data is at issue. The password and user ID can be used by the data subject with network access to log onto a secure privacy response web portal for "OPT IN", "OPT OUT" and data correction purposes.

Privacy Notification and Call Center 2 located, for example, in Fargo, N. Dak., is at the heart of the EU privacy Directive compliance system in accordance with the present invention. All privacy notification forms are securely electronically forwarded via NOC 1 to the Privacy Notification Center for human and electronic processing. Each form is logged utilizing well known A.C.I.D. transaction procedures. The information is then transformed into privacy notification letters in both English and the language of the EU data subject's country mailing address. Notifications letters are securely electronically forwarded to a Central Office 3 for posting via standard mail to the EU data subject's mailing address. All EU Data subject's electronic responses are securely returned electronically to the notification center. All postal responses are returned to and electronically transformed by the Central Office and forwarded to the notification center which in turn notifies the member client that the proper notification letter has been sent and that they are now to take the legally required compliance action based on the data subject's specific response to the letter or that were obtained form the data subject via the privacy non repudiation web portal.

A Processing Center 4, for example in Brussels, securely receives the electronic notification letter, logs its receipt, prints the letter and posts to the EU data subject's EU mailing address. Included in each notification letter is a self return EU stamped privacy action response card which provides the EU data subject the opportunity to "OPT IN" or "OPT OUT" or request that category information be corrected by the member client. Also included in the privacy notification letter is the EU data subject's unique ID and password to access the secure privacy non repudiation web portal of the present invention in order to electronically respond if they so desire. All physical response cards are returned to the EU office and transformed into electronic form and forwarded to the privacy processing center in North Dakota.

The EU date subject receives the privacy notification letter at his or her EU mailing address. Non deliverable notification letters are returned the Processing Center 4 and so logged in the A.C.O.D "transactions data base. He or she completes the self mailer privacy action card and returns to Processing Center 4 or in the alternative logs onto the secure privacy notification response web portal utilizing their unique user ID and password supplied in the notification letter. Non responses that were neither physically nor electronically received are reported and logged at the privacy processing center for A.C.I.D. data base inclusion.

Figure 2:
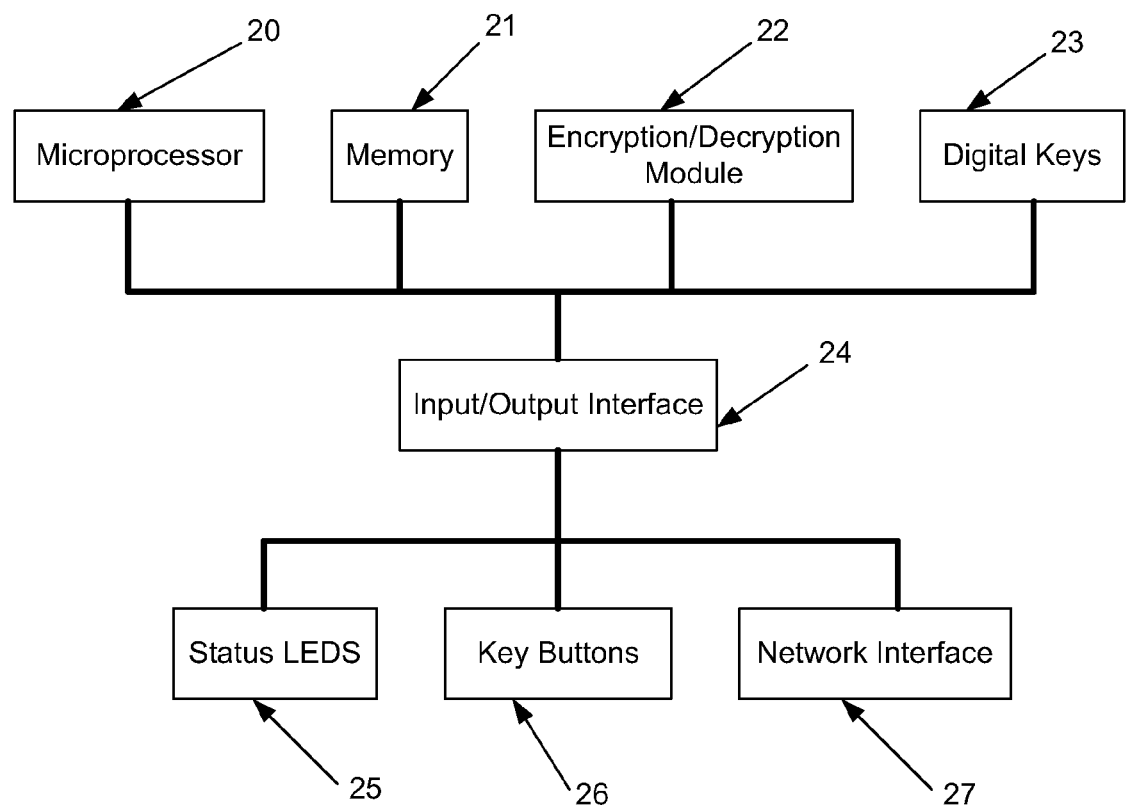
FIG. 2 is flow chart illustrating the notification of a data subject in accordance with the present invention.

Accordingly, the present invention provides an efficient method for those companies that are subject to the EU Direction to comply with its notification requirement and the safeguarding of personal information. FIG. 2 is a flow chart illustrating the operation of the notification method in accordance with the present invention.

The safeguarding of personal information in the way maintained by the EU Directive does not address the issue of unauthorized access to a computers and computer networks.

In accordance with the present invention, a novel security module is provided to each user of the computer network. The module includes unique digital keys that are assigned to specific network users. In order to use the network, a user must insert his or her security module into a reader port attached to the network. Insertion of the module into the reader causes a secure message to be sent to a key validation server on the network. The server validates the digital key contained within the security module against a certificate authority. If validation is successful, the user is permitted to access the network to the level of authority granted to that particular user. The validation server might also require that the identity associated with the key be bound to a master key.

The security module of the present invention may also be used to configure network architecture in a predetermined manner. For example, a user might be able to access certain network resources without use of the security module. When the module is used, additional resources would be made available to the user. In another example, certain security features of the network, such as encryption, could be enabled when the key is used. Encryption would be especially desirable in a wireless network.

Figure 3:
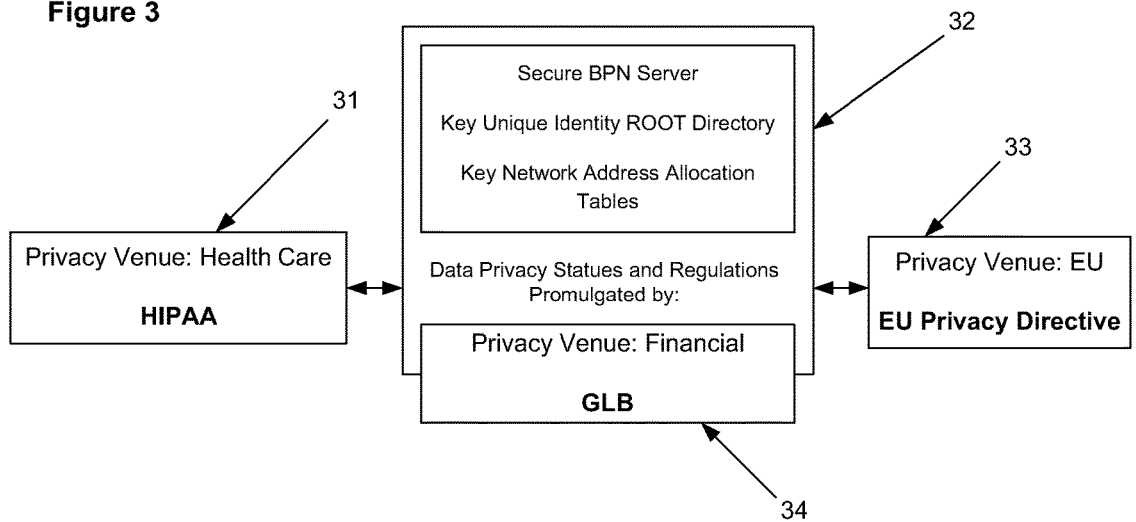
FIG. 3 is a block diagram of one embodiment of a security module in accordance with the present invention.
Figure 4:
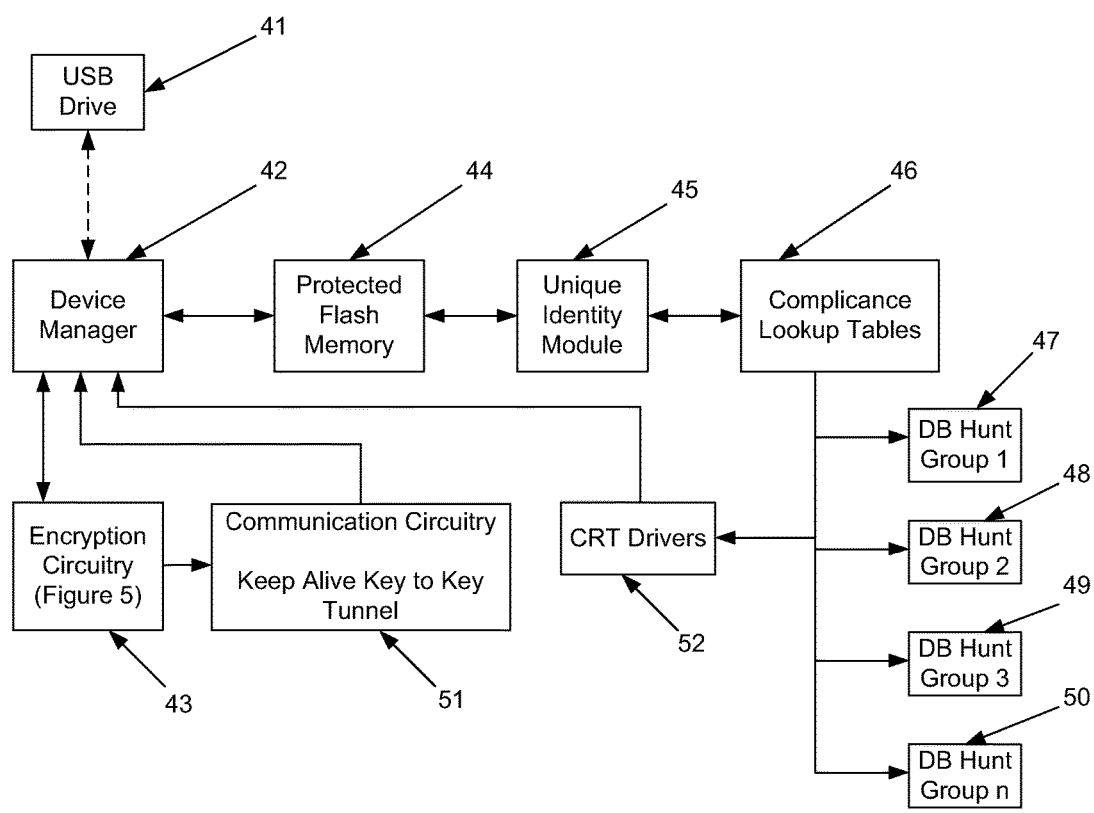
FIG. 4 is a block diagram of a further embodiment of a security module in accordance with the present invention.
Figure 5:
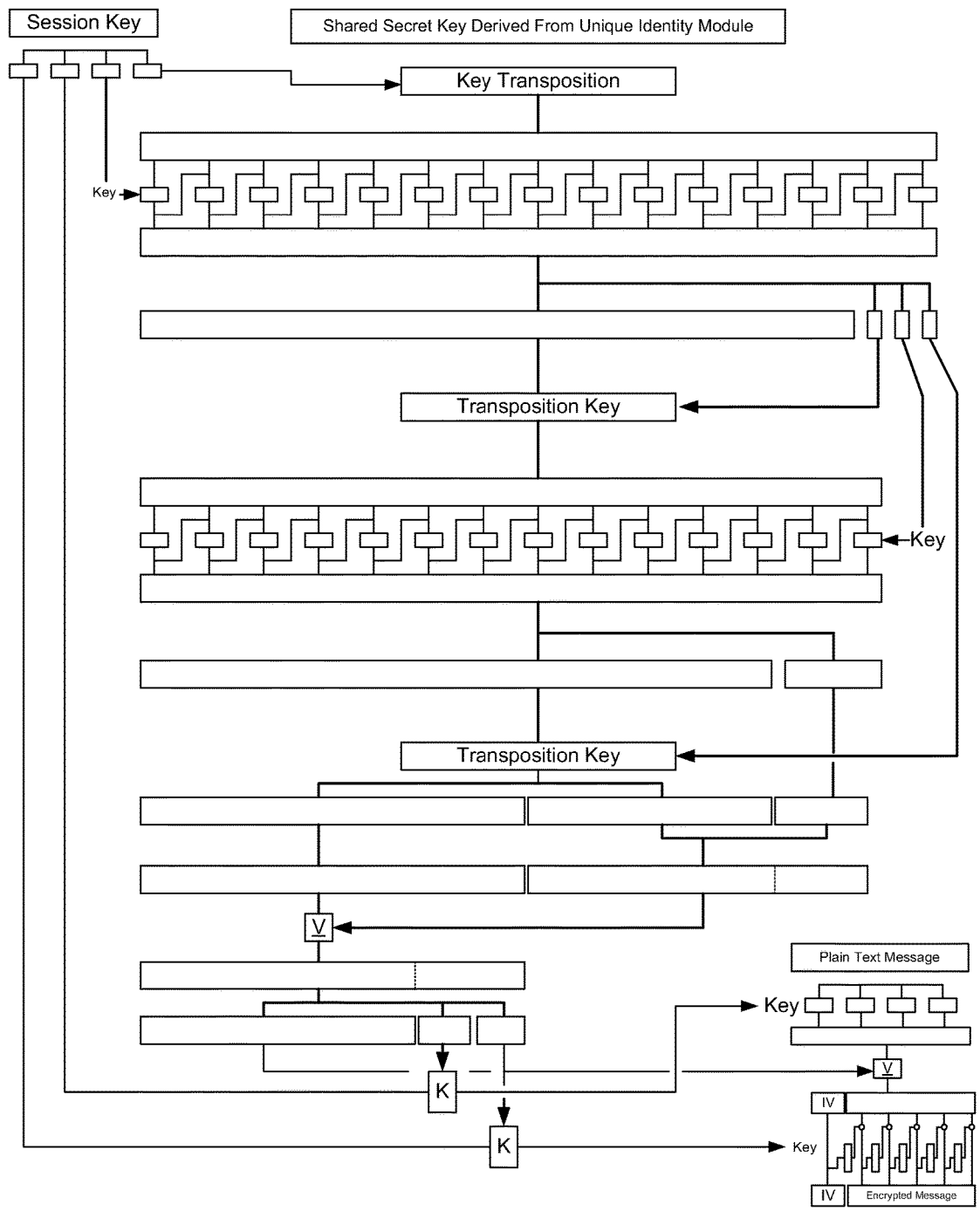
FIG. 5 is a block diagram of one embodiment of encryption circuitry as referenced in FIG. 4.

FIG. 3 is a block diagram of one embodiment of a security module in accordance with the present invention. The module includes a microprocessor 30 for executing a stored computer program that controls the operation of the module, memory 31 for storing computer program instructions and data, encryption/decryption module 32 for encrypting and decrypting data generated and used by the module, digital keys 33, Input/Output Interface 34 to which Status LEDS 35 for the module are coupled alone with Key Buttons 36 which can be activated by the user and Network Interface 37 which interfaces, for example, to a module reader device connected to the network. These elements individually are known in the art. They are arranged in a novel manner in FIG. 3 in accordance with the present invention.

In yet another embodiment of the invention, non repudiation of authorized users and access controls to internal and external e-mail servers and user's electronic mailboxes could be enabled by binding the identity of the users to their specific physical key and utilizing said key as a trusted token for electronic entry, egress and logging audit trails from the email system(s).

A number of encryption techniques may be used with the present invention. Such techniques include x.509 and RFC 2459 signature encryption. Also included as an encryption algorithm is an elliptic curve digital signature algorithm (ECDSA) and most specifically a Koblitz or anomalous binary curve.

The present invention should not be considered limited to these particular examples described above, but rather should be understood to cover all aspects of the invention as fairly set out in the attached claims. Various modifications, equivalents processes, as well as numerous structures to which the present invention may be applicable will be readily apparent to those of skill in the art to which the present invention is directed upon review of the instant specification.

We claim:

1. A method of facilitating database agnostic compliance with privacy notification requirements imposed by laws, regulations, policies and directives when a requester uses a client computer to make a request for a data subject's data from a database containing data fields requiring privacy compliance notices, said method comprising the steps of:
   requiring said requestor to authenticate his/her identification to a secure electronic network using an electronic security module inserted into the client computer before having access to said secure electronic network;
   after successful authentication, receiving the request for the data subject's data;
   determining the privacy data fields within a plurality of data fields which are subject to privacy notification requirements to the data subject based on the request;
   transforming said privacy data fields into human readable heuristic data screens;
   converting said heuristic data screens into a privacy notification for presentation to the data subject;
   sending, to the data subject, the privacy notification; and
   receiving a response, from the data subject, to opt in, opt out or to correct said data.

2. The method according to claim 1, wherein said privacy compliance notices are accomplished via a secure web portal.

3. The method according to claim 1, wherein said privacy compliance notices are accomplished via a secure email system.

4. The method according to claim 1, wherein said privacy compliance notices are accomplished using digital certificates comprising:
   a public or private, commercial or government registration authority;
   a public or private, commercial or government certificate authority;
   a digital signature encryption algorithm;
   a unique non-reputable user electronic identity;
   issuance of x.509 compliant certificates specifically encoded via extension to alert data processor of the data subjects privacy preferences; and
   issuance of x.509 standard certificates specifically encoded via extension to alert data processors of legal and regulatory compliance requirements relevant to a data subject's privacy preferences.

5. The method according to claim 4, wherein the method further includes a digital signature algorithm is using SHA-1 with DSA.

6. The method according to claim 5, wherein said digital signature algorithm is an elliptic curve.

7. The method according to claim 6, wherein said elliptic curve is a Koblitz binary curve.

8. The method according to claim 5, wherein said digital signature algorithm is a block cipher.

9. The method according to claim 1, wherein said electronic security module further including a hardware data encryptor coupled to a central processing unit (CPU) for encrypting data returned by said database.

10. The method according to claim 1, wherein said electronic security module further including a non-repudiation module coupled to a central processing unit (CPU) and being uniquely associated with an electronic digital security key.

11. The method according to claim 1, wherein said electronic security module further including a non-repudiation module coupled to a central processing unit (CPU) and being uniquely associated with the user of said electronic security module.

12. The method according to claim 1, wherein an electronic digital security key, for authenticating said requestor, is x.509 compliant.

13. The method of claim 1, wherein an encryption/decryption module, on said electronic security module for encrypting/decrypting data, is implemented in hardware.

14. The method of claim 1, wherein an encryption/decryption module, on said electronic security module for encrypting/decrypting data, is implemented in firmware.

15. The method of claim 1, wherein an encryption/decryption module, on said electronic security module for encrypting/decrypting data, is implemented in software.

16. A non-transitory computer readable medium including instructions to perform a method of facilitating database agnostic compliance with privacy notification requirements imposed by laws, regulations, policies and directives when a requester uses a client computer to make a request for a data subject's data from a database containing data fields requiring privacy compliance notices, said method comprising the steps of:

requiring said requestor to authenticate his/her identification to a secure electronic network using an electronic security module inserted into the client computer before having access to said secure electronic network;

after successful authentication, receiving the request for the data subject's data;

determining the privacy data fields within a plurality of data fields which are subject to privacy notification requirements to the data subject based on the request;

transforming said privacy data fields into human readable heuristic data screens;

converting said heuristic data screens into a privacy notification for presentation to the data subject;

sending, to the data subject, the privacy notification; and receiving a response, from the data subject, to opt in, opt out or to correct said data.

17. A peripheral memory device comprising:

an interface configured to couple to a client computer;

a memory storing instructions; and a processor executing said instructions to perform a method of facilitating database agnostic compliance with privacy notification requirements imposed by laws, regulations, policies and directives when a requester uses the client computer to make a request for a data subject's data from a database containing data fields requiring privacy compliance notices, said method comprising the steps of:

requiring said requestor to authenticate his/her identification to a secure electronic network using an electronic security module inserted into the client computer before having access to said secure electronic network;

after successful authentication, receiving the request for the data subject's data;

determining the privacy data fields within a plurality of data fields which are subject to privacy notification requirements to the data subject based on the request;

transforming said privacy data fields into human readable heuristic data screens;

converting said heuristic data screens into a privacy notification for presentation to the data subject;

sending, to the data subject, the privacy notification; and receiving a response, from the data subject, to opt in, opt out or to correct said data.

* * * * *